Figure 1:
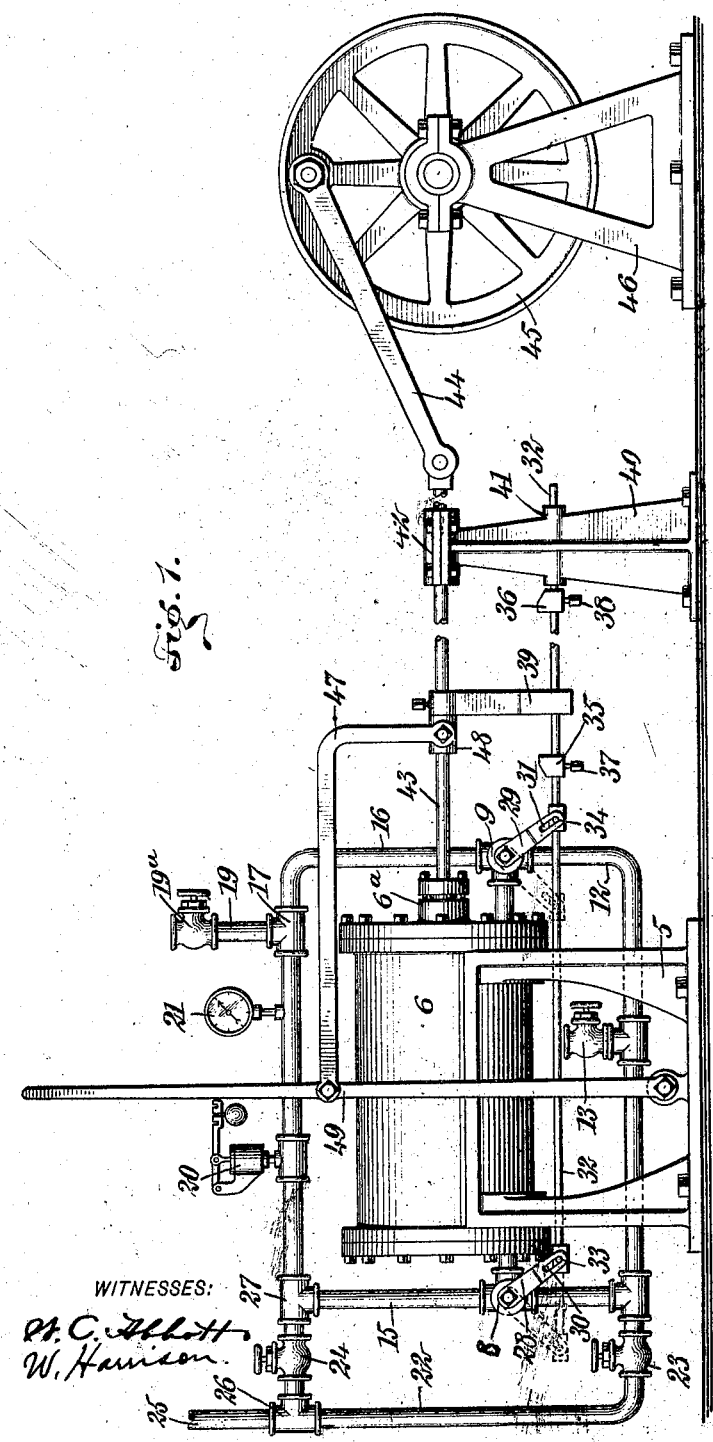

No. 847,763. PATENTED MAR. 19, 1907.
A. GOOD.
AIR COMPRESSOR.
APPLICATION FILED AUG. 26, 1905.

2 SHEETS—SHEET 1.

WITNESSES:
A. C. Abbott
W. Harrison

INVENTOR
Adam Good
BY
Munn
ATTORNEYS

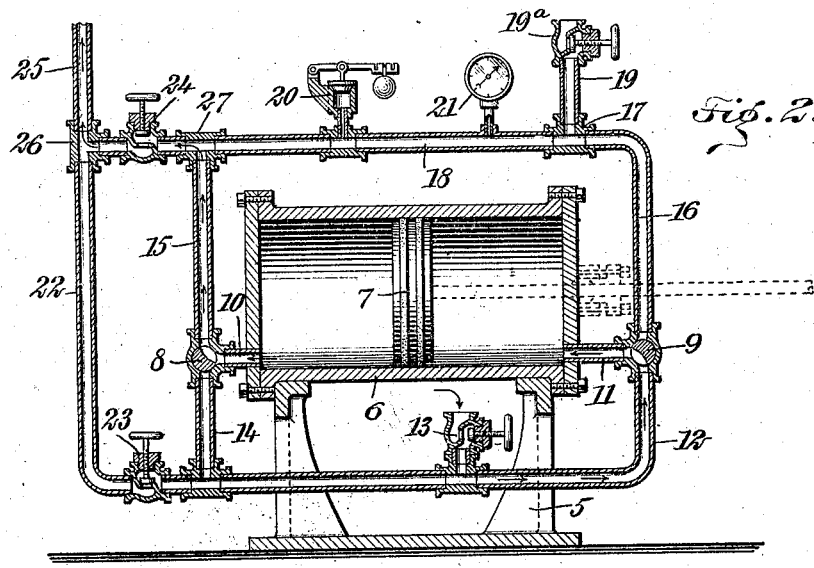

UNITED STATES PATENT OFFICE.

ADAM GOOD, OF CLAFLIN, KANSAS.

AIR-COMPRESSOR.

No. 847,763.  Specification of Letters Patent.  Patented March 19, 1907.

Application filed August 26, 1905. Serial No. 275,905.

*To all whom it may concern:*

Be it known that I, ADAM GOOD, a citizen of the United States, and a resident of Claflin, in the county of Barton and State of Kansas, have invented a new and Improved Air-Compressor, of which the following is a full, clear, and exact description.

My invention relates to cylinders and valve mechanism suitable for use as an air-compressor or as an engine.

Reference is to be had to the accompanying drawings, forming a part of this specification, in which similar characters of reference indicate corresponding parts in all the figures.

Figure 1 is a side elevation showing my device ready for use. Fig. 2 is a vertical longitudinal section through the cylinder and its accompanying parts, and Figs. 3 and 4 are enlarged vertical sections through the plug-valves used in connection with the cylinder.

The framework is shown at 5 and the cylinder at 6, the latter being provided with the stuffing-box 6ª. A piston is shown at 7 and a pair of plug-valves at 8 9. These plug-valves are adapted to rock and are connected by necks 10 11 with the cylinder. Below the valve 9 is a pipe 12, and connected with this pipe is a hand-valve 13. Below the plug-valve 8 is a pipe 14, communicating with the pipe 12. Extending upwardly from the plug-valves 8 9 are pipes 15 16, the latter connecting with a T 17. Connected with this T is a pipe 18. Extending from the T 17 is a pipe 19, provided with a hand-valve 19ª. A safety-valve is shown at 20 and a pressure-gage at 21. A pipe 22 is provided with a hand-valve 23. Intermediate of the pipes 15 and 22 is a hand-valve 24. Adjacent to this hand-valve is a T 26, and from this T a pipe 25 leads away to any desired point—say to the bottom of a mine. The pipe 18 is provided with a T 27, which communicates with the pipe 15. The plug-valves 8 and 9 are provided with arms 28 29, having slots 30 31, and connecting these two arms together is a sliding rod 32, provided with pins 33, which project through the slots 30 31. Mounted upon the sliding rod 32 are stop-plugs 35 36, provided, respectively, with set-screws 37 38, whereby the stop-plugs may be adjusted. An arm 39 is adapted to engage the stop-plugs 35 36 successively, so as to give a quick intermittent motion to the sliding rod 32. A post 40 is provided with a bearing 41, which supports one end of the sliding rod 32. This post is further provided with a bearing 42, which supports the piston-rod 43. A connecting-rod 44 is journaled to the piston-rod 43 and is also connected with a wheel 45, to which power may be communicated. This wheel is journaled upon a frame 46. A pitman 47 of substantially L shape is journaled upon a head 48, carried by the piston-rod 43, and is pivotally connected with a hand-lever 49.

The operation of my device it as follows: Motion is communicated to the sliding rod 43 by means of either the hand-lever 49 or the wheel 45, as the case may be—that is to say, when the cylinder 6 and its accompanying parts are to be used by pressing or pumping a medium the hand-lever 49 or the wheel 45 is employed for actuating the piston-rod 43. One use made of the device when the piston-rod 43 is actuated as above is to compress air, so as to supply the same to a mine. If, on the other hand, it be desired to use the apparatus as an engine or analogous motor, an aeriform body, such as steam or compressed air, is supplied under pressure through the hand-valve 13. The motion of the piston is substantially the same no matter whether the device be used as a prime mover or as a driven unit. Motion being communicated to the piston-rod 43 as above stated, the aeriform body is forced first out of one end of the cylinder and then out of the other after the manner of a reciprocating pump. When the piston 7 moves to the left according to the view shown in Fig. 2, the aeriform body passes outward through the plug-valve 8, pipe 15, valve 24, and pipe 25. Meanwhile a new supply of the aeriform body is taken in through the valve 13, pipe 12, plug-valve 9, and neck 11. When the piston 7 is moving to the left, the valves 8 9 occupy the respective positions indicated in Fig. 2. When, however, the piston reaches the end of its stroke to the left, the valves 8 and 9 are turned, as indicated in Figs. 3 and 4. The aeriform body is now admitted through the valve 13, pipe 14, valve 8, and neck 10, whereas the aeriform body being expelled passes out through the neck 11, valve 9, pipes 16 and 18, and pipe 25. The movements above described being once understood, it is easy to see that if the valve 24 be closed and the valve 23 be opened the device may be used for withdrawing an aeriform body through the pipe 25 and expelling the same through the valve 19ª. The device is used in this way for the purpose of removing choke-damp and noxious gases from mines and causing the mines to be filled with fresh and pure air.

Having thus described my invention, I claim as new and desire to secure by Letters Patent—

1. In a device of the character described, the combination of a cylinder, a piston movably mounted therein, revoluble plug-valves connected with the ends of said cylinder, a pair of pipes leading to said plug-valves, means admitting an aeriform body therethrough into said cylinder, a pair of pipes leading from said plug-valves, means connected with said last-mentioned pipes for receiving said aeriform body as delivered thereto from said cylinder, and means connected with both of said valves for reversing the same.

2. In a device of the character described, the combination of a cylinder, a piston movably mounted therein, revoluble plug-valves connected with the ends of said cylinder, a pair of pipes leading to said plug-valves, means connected with said pipes for admitting an aeriform body therethrough into said cylinder, a pair of pipes leading from said plug-valves, means connected with said last-mentioned pipes for receiving an aeriform body as delivered from said cylinder, crank-arms connected with said revoluble plug-valves for actuating the same, a rod connecting said cranks together, stop-plugs mounted upon said rods, and means controllable by movements of said piston, for actuating said stop-plugs.

In testimony whereof I have signed my name to this specification in the presence of two subscribing witnesses.

ADAM GOOD.

Witnesses:
PETER KRIER,
GEORGE STARR.